(12) United States Patent
McLoone et al.

(10) Patent No.: US 6,556,150 B1
(45) Date of Patent: Apr. 29, 2003

(54) ERGONOMIC COMPUTER INPUT DEVICE

(75) Inventors: Hugh E. McLoone, Bellevue, WA (US); Gregory G. Jones, Seattle, WA (US); Melissa S. Jacobson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/533,998

(22) Filed: Mar. 24, 2000

(51) Int. Cl.[7] ......................... H03M 11/00; H03K 17/94
(52) U.S. Cl. .......................................... 341/20; 345/163
(58) Field of Search ............................ 341/20; 345/163, 345/157, 167

(56) References Cited

U.S. PATENT DOCUMENTS

| | | | |
|---|---|---|---|
| 4,862,165 A | 8/1989 | Gart | |
| 5,374,942 A | * 12/1994 | Gilligan et al. | 345/157 |
| D374,867 S | 10/1996 | Canavan | |
| D406,121 S | 2/1999 | Edwards et al. | |
| 5,894,302 A | 4/1999 | Scenna et al. | |
| D409,181 S | 5/1999 | Edwards et al. | |
| D410,638 S | 6/1999 | Sheehan et al. | |
| D415,746 S | 10/1999 | Edwards et al. | |
| 6,031,518 A | 2/2000 | Adams et al. | |
| 6,031,522 A | 2/2000 | Strand | |
| D431,037 S | 9/2000 | Varga et al. | |
| D438,208 S | * 2/2001 | Jones et al. | D14/409 |
| D438,211 S | * 2/2001 | Jones et al. | D14/409 |
| 6,256,013 B1 | 7/2001 | Siddiqui | |
| 6,292,175 B1 | 9/2001 | Sheehan et al. | |
| 6,300,941 B1 | 10/2001 | Segalle | |

FOREIGN PATENT DOCUMENTS

FR   2 698 986 A3   6/1994

OTHER PUBLICATIONS

Computer Expo 1999, "Logitech Trackman Marble+," printed in a Circuit City Advertisement, 1 page, dated Jul. 18, 1999.

* cited by examiner

*Primary Examiner*—Timothy Edwards
(74) *Attorney, Agent, or Firm*—Banner & Witcoff, Ltd.

(57) ABSTRACT

A computer input device that comfortably supports the hand of the user while the thumb and fingers are associated with buttons, a trackball, and a scrolling wheel carried on the device. The overall configuration of the device and the arrangement of these actuators permit the user to easily and effectively operate all of the functions provided by the actuators while the hand and arm of the user are in a comfortable position. The device includes a housing having an asymmetrical dividing ridge forming a "thumb-side surface," for placement of the thumb, and a "finger-side surface," for placement of the remaining four fingers. The finger-side surface includes a ball rotatably mounted in the housing and further includes first and second input buttons disposed to the side of the ball which may be used as "forward" and "back" buttons. The first and second input buttons adjacent to the ball may be replaced by a linearly slidable or pivotally movable actuator. The movable member is preferably of the three-position-type enabling the user to activate the movable member in a forward or a backward direction for transmission of respective signals to the computer. The thumb-side surface includes a horizontally-disposed scrolling wheel and third and fourth buttons on opposite sides of the scrolling wheel that can be used as "primary" and "secondary" buttons. The primary button has a curved bottom portion that serves as a thumb rest, and may be used as such without activating the button as the button is movable laterally towards the fingers.

39 Claims, 7 Drawing Sheets

ERGONOMIC COMPUTER INPUT DEVICE

TECHNICAL FIELD

This invention relates to an ergonomically designed computer input device. More specifically, the invention relates to an ergonomically designed computer input device for supporting the hand of a user and having a user-manipulable movable ball.

BACKGROUND OF THE INVENTION

Computer input devices for entering commands into a computer are well known and currently available in a variety of configurations. Many such input devices take the form of a mouse or a trackball device. The term "mouse" is commonly used to refer to a computer input mouse design having a tracking system such as a lower mounted ball or an optical tracking system, for determining the relative movement between the mouse and a surface upon which it rests. The term "trackball device" is commonly used to refer to a computer input device having a body and a rotatable ball coupled to the body for direct manual engagement by a user when the trackball device is resting on a supporting surface. Both the mouse and the trackball device can control the cursor on a computer screen.

A mouse frequently includes a rotatable ball mounted to the bottom of a housing. When the mouse is moved over a supporting surface, encoders sense the movement of the ball and generate signals indicative of the direction and amount of that movement. The signals are supplied to a computer and used, for example, to control movement of a cursor on the screen of the computer. The cursor on the computer screen would then be moved in a direction and by an amount corresponding to the movement of the ball. In another arrangement for the mouse, an optical tracking system is used in lieu of the mechanical ball tracking system to measure movement of the mouse with respect to the supporting surface.

A trackball-type input device, on the other hand, has its rotatable ball exposed for manipulation by the user's finger(s) and/or thumb. Ball-movement signals are generated, similar to those described with a mouse, and a cursor on the computer screen is moved in a direction and by an amount corresponding to the movement of the ball. The rotatable ball may be sensed by any conventional mechanical or optical sensing system or any other desired technique. For example, if a mechanical sensing system is used, the ball may be supported on a pair of perpendicular rollers. If an optical sensing system is used, a light source may be reflected off of a portion of the ball, and an optical sensor may determine the relative movement of the ball.

Computer input devices, including the mouse and the trackball device, may also include one or more buttons and/or a wheel. Typically, depressing one of the buttons changes the state of an associated switch, which permits a user to enter various commands into the computer. The nature of the command usually depends upon the position of the cursor on the screen. A roller or wheel typically protrudes from the top of the device and is coupled to an encoder for producing a signal indicating the rotation of the wheel. That signal may be used, for example, for scrolling through a window displayed on the computer, which function was heretofore performed by moving the cursor to the window "scroll bar" and depressing a button as needed to scroll through whatever is displayed in the window. For convenience, the wheel will hereafter be referred to as a "scrolling wheel." The buttons, trackball, and scrolling wheel may be collectively referred to as the actuators carried on the input device.

Irrespective of the type of input device employed, mouse or trackball, it is advantageous that the device be comfortable for the user to operate, especially over long periods of time. Such comfort is obtained by careful attention to ergonomic factors, particularly toward minimizing stress in the user's fingers, wrist, and forearm. Providing a comfortable computer input device can be especially challenging when one's design goal includes enhancing the function of the device over prior devices. Particularly, prior art finger-controlled trackball devices include drawbacks relating to comfort and/or functionality preventing optimal usability. For example, existing trackball devices do not adequately support the user's thumb without restricting its motion. Accordingly, an improved ergonomic computer input device was thus needed that overcomes drawbacks of existing designs. More specifically, an improved ergonomic finger-controlled trackball device that maximizes comfort and functionality was thus needed.

SUMMARY OF THE INVENTION

In view of the foregoing, the present invention provides an improved computer input device that eliminates the drawbacks of the prior art.

The present invention also provides a computer input device that effectively supports the hand enabling comfortable and efficient activation of various actuators positioned on the housing by the user.

The present invention provides an ergonomic finger-controlled trackball device. The device includes a housing having an asymmetrical dividing ridge forming a thumb-side, for placement of the thumb, and a finger-side, for placement of the remaining four fingers. The finger-side surface includes a ball rotatively mounted in the housing and further includes first and second input buttons disposed on the side of the ball which may be used as "forward" and "back" buttons. The thumb-side surface includes a horizontally-disposed scrolling wheel and third and fourth buttons on opposite sides of the scrolling wheel that can be used as "primary" and "secondary" buttons.

According to one aspect, the invention includes a computer input device having a housing and an actuator. The housing includes a thumb side adapted for interfacing with a thumb of a hand of a user and a finger side adapted for interfacing with a plurality of fingers of the hand of the user. The actuator includes a wheel positioned on the thumb side enabling its manipulation by the thumb of the user.

According to one aspect, the invention includes a computer input device having a housing and an actuator. The housing includes a bottom supporting surface adapted to interface with a planar work surface. The actuator includes a wheel mounted for movement in a plane substantially parallel to the work surface.

According to another aspect, the finger-side of the housing has a ball actuator and the thumb-side of the housing has a horizontally-disposed rotatable wheel that is rotatable by moving the thumb with a forward and back motion. Further, there are input buttons on opposite sides of the thumb wheel spanning from the top to the bottom of the thumb-side surface. This interrelationship enables the scrolling wheel to act as a locating divider between the two input buttons.

According to one aspect of the present invention, a method of providing input signals to a computer includes the steps of placing a thumb against a wheel rotatively mounted to a computer input device, and moving the thumb to rotate the wheel.

In yet another aspect of the invention, a computer input device has a housing and an actuator. The actuator includes a linearly slidable member coupled to the housing and being disposed for engagement by a user. Activation of this actuator causes the input device to send a signal to a computer to produce a command.

Another facet of the invention includes a computer input device having a housing, a first actuator, and a second actuator. The housing includes a thumb side adapted for interfacing with a thumb of the hand of a user and a finger side adapted for interfacing with a plurality of fingers of the hand of the user. The first actuator has a pivotally movable member coupled to the housing to be engaged by a user, and adapted to send a signal to a computer when activated. The second actuator includes a sphere for finger engagement mounted to the housing for rotational movement.

In another aspect of the invention, a computer input device has a housing and an actuator. The housing has a thumb side adapted for interfacing with a thumb of the hand of the user and a finger side adapted for interfacing with a plurality of fingers of the hand of the user. The actuator includes an input button mounted to the thumb side of the housing. The input button of the actuator has a supporting surface adapted to serve as a thumb rest for the user. Further, the input button is laterally depressible in a direction toward the finger side of the housing for activation. Additionally, a downward force on the supporting surface of the input button will not activate the actuator.

Another facet of the invention includes a curved thumb-supporting input button for a computer input device. This button may be located below a scroll wheel on the thumb-side surface of the device. Preferably, the button is curved near its bottom edge to support and cradle the thumb, and provide an effective resting area for the thumb.

The foregoing and other features and advantages of the preferred embodiments of the present invention will be more readily apparent from the following detailed description, which proceeds with reference to the accompanying drawings.

DETAILED DESCRIPTION OF PREFERRED EMBODIMENTS

FIGS. 1–7 and 9–17 depict an ergonomic computer input device 20 configured in accordance with a preferred embodiment of the present invention. The device 20 includes a body or housing 22 having a base or flattened bottom 23 for resting on a planar work surface, such as a desktop 25. The housing 22 is preferably comprised of a plurality of pieces to facilitate the assembly process. The housing 22 is preferably made from a rigid plastic or other suitable material. The input device 20 has a plurality of actuators carried by the housing 22 enabling a user to provide desired signals to a computer.

In a preferred embodiment as shown in FIGS. 1–7, six independently-operable actuators are carried by the housing 22. The actuators preferably include a plurality of buttons or buttons 28, 30, 37 and 39, a trackball 32, and a wheel 34. It is recognized that through various known arrangements, such as a software driver, each of the buttons 28, 30, 37 and 39 can be mapped and/or remapped to provide a signal resulting in any desired command acceptable for various software applications. Additionally or alternatively, if desired, a processor or other intelligent device may be included inside of the housing 22. However, for reference purposes, the buttons 28, 30, 37 and 39 are referred to in the specification by a preferred input that they may provide. For example, button 28 provides a signal that is "primary" for most software programs and is herein referred to as the primary button 28. Button 30 provides a signal that is "secondary" for most software programs and is herein referred to as the secondary button 30. Buttons 37 and 39 preferably provide signals that respectively correspond to "back" and "forward" commands on an internet browser program. These buttons 37 and 39 are herein referred to as the back button 37 and the forward button 39.

Each of the buttons 28, 30, 37, and 39 may be depressed. A switching function is carried out by depressing each button, like the function performed by a conventional mouse when one depresses or "clicks" a button. Specifically, depressing any of the buttons 28, 30, 37, and 39 changes the associated switch state and generates a signal that is conveyed via conductors in a cord 36 to a computer 40. One end of the cord 36 is anchored inside of the device housing 22. The cord emanates from the front or distal end 38 of the device 20, and the other end of the cord is coupled with the computer 40. However, it is recognized that a cord 36 is not needed and the device 20 may be wirelessly coupled to computer 40 by any known arrangement, such as by transmitting and receiving infrared, radio frequency, or ultrasonic signals.

Figure 1:
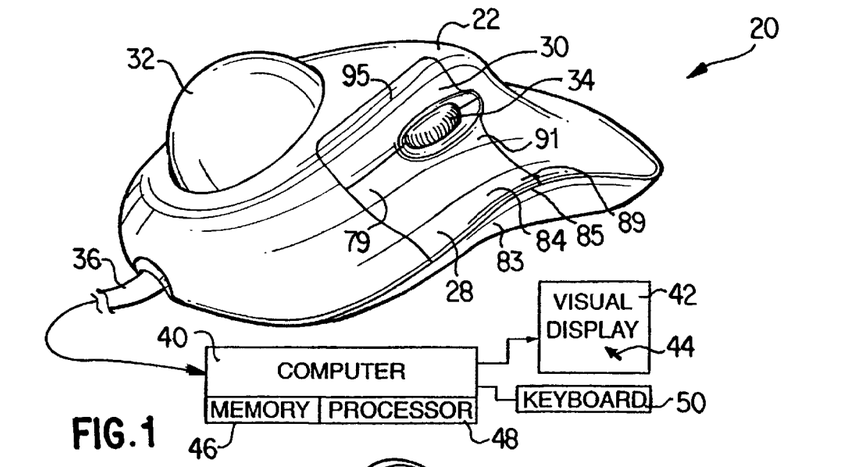
FIG. 1 is a front-radial perspective view of the computer input device schematically coupled to a computer.

The computer 40 may be any one of many different designs. As one example of the many possible configurations and arrangements of devices that the input device 20 may transmit signals to, the computer 40 preferably includes a visual display device 42. The display 42, which may be a cathode ray tube-type, active matrix display, or other suitable device, can display a cursor or pointer 44, along with text and other graphic information. The computer may also include storage or memory 46, a processor 48, and a keyboard 50.

The tracking ball 32 is a sphere and preferably mounted in a concave region of the housing 22 for rotation about any axis. The tracking ball 32 includes an exposed surface when it is resting on a supporting surface 25 permitting it to be directly manipulated by a user. To operate the tracking ball 32, the housing 22 remains stationary and the ball 32 is moved relative to the housing 22 by the user. Optical and/or mechanical sensors detect the movement of the ball 32 in a conventional manner. The sensed movement of the ball 32 is processed and a signal correlating to the rotation of the ball 32 is conveyed via cord 36 or wirelessly to the computer 40. The received signals may be employed, for example, for moving the pointer 44 across the display 42.

The wheel 34 may be of any desired type. For example, the wheel 34 may be supported on an axle that resides within the body 22 of the input device. That axle may be carried by spaced-apart axle supports. Optical and/or mechanical sensors detect the movement of the wheel 34 in a conventional manner. For example, an optical encoder may be positioned on the axle for rotation with the wheel. A light source and a light sensor may be mounted within the device to sense the motion of the optical encoder. The sensed movement of the wheel 34 is processed and a signal correlating to the rotation of the wheel 34 is conveyed via cord 36 or wirelessly to the computer 40. The received signals may be employed, for example, for scrolling an image on the display 42.

If desired, the axle supports can be configured to allow one or both ends of the axle to move in a direction that is generally perpendicular to the axis of rotation of the wheel. Thus, the wheel may be depressed, slightly moving its axle to activate a switch. A spring is contained within the housing and arranged to resist depression of the wheel and bias the wheel 34 into an outward position. The switch that is engaged as a result of depression of the wheel provides a switching signal. A detent mechanism may also be provided on the axle to provide a segmented feel to the rotation of the wheel 34. The wheel switch signal is conveyed via the cord 36 or wirelessly to the computer for any desired purpose.

Figure 8:
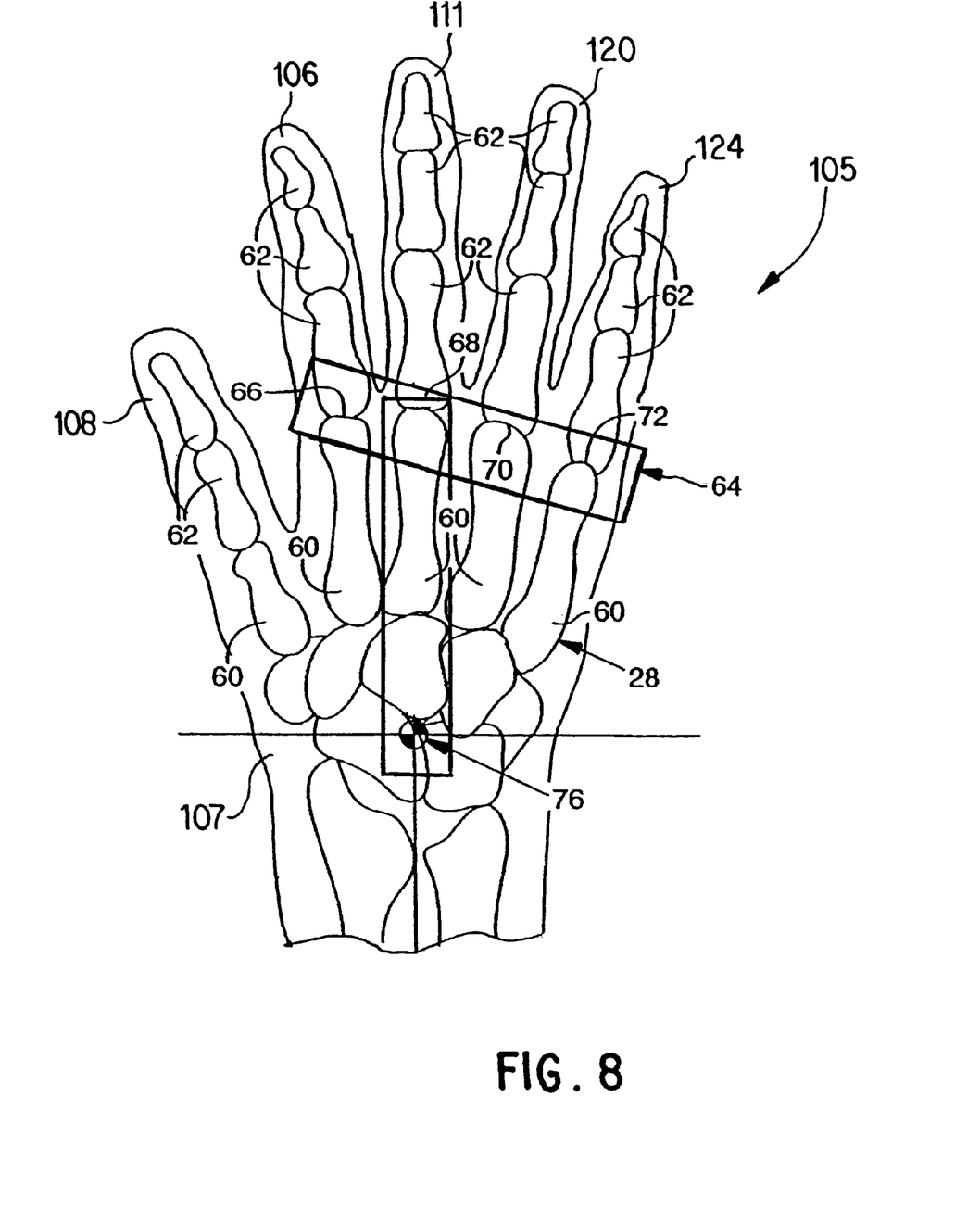
FIG. 8 is a top plan view skeletal diagram of the right hand of a user with the outer edges of the finger and hand superimposed thereon.

Before proceeding with additional characteristics of the input device 20, certain concepts and terminology relating to the human hand are herein described. This is accomplished in part by reference to FIG. 8. As shown in FIG. 8, the hand 105 has a wrist area 107. There are five major hand bones radiating from the wrist area 107, which are known as the metacarpals 60. The finger bones number fourteen in each hand and are designated phalanges 62. While the depicted embodiment represents a right-hand input device, a mirror image version may be provided for use by a user's left hand. Accordingly, a right hand is depicted in FIG. 8 and also in FIGS. 9–13. In this description, the particular fingers will carry conventional designations: from left to right in FIG. 8, the thumb 108, the index finger 106, the middle finger 111, the ring finger 120, and the little finger 124.

Where the index, middle, ring, and little finger 106, 111, 120, and 124 meet the palm or, more precisely, where the metacarpal bones 60 and phalangeal bones 62 of the fingers join, there are metacarpal-phalangeal joints 66, 68, 70, 72. A metacarpal-phalangeal ridge 64 is defined by the portion of the hand in the vicinity of these four joints. Thus, the metacarpal-phalangeal ridge 64 includes the metacarpal-phalangeal joints of all of the fingers except for the thumb. The housing 22 of input device 20 is configured to support the metacarpal-phalangeal joint ridge 64 and the remainder of the hand 105, so that the user's hand and arm remain comfortable, and the user's fingers may comfortably manipulate the actuators.

As seen in FIGS. 1–7, the housing 22 includes an upper hand supporting surface 81 that is preferably sized to support the entire hand 105 when the input device 20 is in use. For clarity purposes, it is noted that certain portions of the input device 20 and views are described in conjunction with corresponding portions of the human hand 105. For example, the side of the input device 20 where the thumb 108 lies when in use is referred to herein as the radial or thumb side 71. Similarly, the side of the input device 20 where the remaining four fingers 106, 111, 120, 124 lie when in use is referred to herein as the ulnar or finger side 73.

The upper hand supporting surface 81 includes a palm supporting surface 86 at its rear or proximal end 82 that is adapted to support the palm 109 of the user, a radial or thumb supporting surface 84 that is adapted to support the thumb of the user when the input device 20 is in use, and an ulnar or finger supporting surface 96 that is adapted to support the remaining four fingers 106, 111, 120, 124 of the user when the input device 20 is in use. The ulnar or finger supporting surface 96 also supports the metacarpal-phalangeal joint ridge 64.

In a preferred arrangement, the thumb side 71 includes the primary and secondary buttons 28 and 30 and the wheel 34. The finger side 73 includes the back and forward buttons 37 and 39 and the trackball 32. This configuration assists in an efficient and comfortable interface that provides a wide number of command options. The finger side 73 and the thumb side 71 are preferably divided by a dividing ridge 95. As is evident from FIGS. 2 and 3, the dividing ridge 95 is asymmetrical. This places the finger and thumb surfaces 84 and 96 on different planes and enhances the ability of all of the fingers to independently control the actuators.

Figure 4:
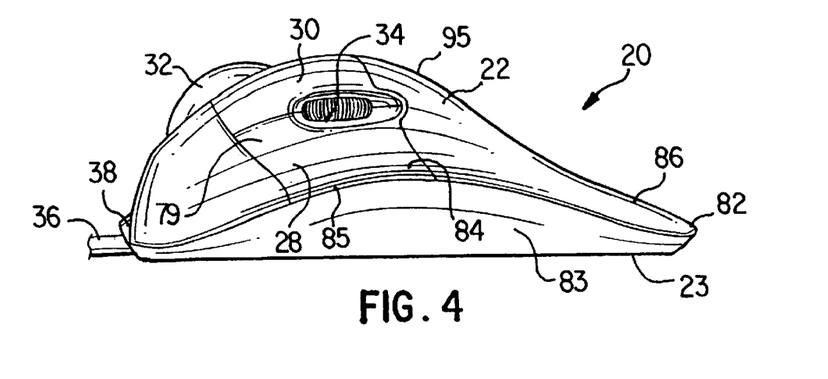
FIG. 4 is a radial side elevational view of the computer input device of FIG. 1.

As best shown in FIGS. 1 and 4, the radial or thumb side 71 includes an outer surface 79 containing the primary and secondary buttons 28 and 30 and the wheel 34. Preferably, both the primary and secondary buttons 28 and 30 are depressible laterally toward the housing. That is, the buttons 28 and 30 are depressible in the direction toward the little finger 124 or the ulnar side of the device 20. The outer thumb surface 79 preferably extends from an upper edge that helps form the dividing ridge 95 down to a lower edge 85. The primary and secondary buttons 28 and 30 span substantially the entire distance from the lower edge 85 to the upper edge or dividing ridge 95. This essentially forms a continuous control panel region whereby the signal that is transmitted depends upon the portion that is depressed. Further, as seen in the figures, the top of the secondary button 30 forms a part of the dividing ridge 95.

Figure 13:
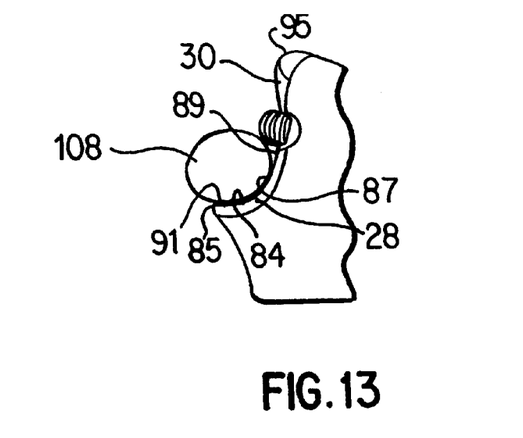
FIG. 13 is a cross sectional view taken through line 13—13 of FIG. 3 illustrating the relationship between the thumb of the user and computer input device.

The thumb supporting surface 84 is part of the outer thumb side surface 79 and is preferably formed by a cradle-like arrangement 87 adjacent its lower edge 85. More specifically, the primary button 28 includes the cradle 87. The outer surface of the primary button 28 has a vertical component 89 and a horizontal component 91. The cradle 87 includes portions of both the horizontal and vertical components 89 and 91. The secondary button 30 is generally vertically disposed and is positioned immediately adjacent to the wheel 34 and the primary button 28. In use, as shown in FIG. 13, the user may place his or her thumb 108 on the cradle 87 and let the full weight of the thumb be carried on the horizontal component 91. Since the primary button 28 is laterally depressible into the housing 22 in a direction toward the other fingers, a slight shift in weight is all that is needed to activate the primary button 28. A downward force applied by the thumb 108 to the horizontal component 91 will not activate the primary button 28. This arrangement effectively provides a thumb rest, reduces fatigue, and facilitates activation.

The wheel 34 is located between the primary and secondary buttons 28 and 30 and is also disposed for activation by the user's thumb 108. The scrolling wheel 34 is preferably mounted substantially horizontally for rotation in a substantially horizontal plane. Accordingly, the wheel 34 is rotatable in a plane parallel to the desk or work surface 25 upon which the input device 20 sits and parallel to the bottom surface 23 interfacing with the work surface 25. This horizontal orientation enables the user to move the wheel by natural flexion and extension movements. This will, in turn, reduce possible fatigue. Further, as is evident from FIG. 13, the user can easily engage the wheel 34 for movement with little adjustment as the horizontal portion 91 of the primary button 28 is supporting the thumb 108 immediately adjacent to the wheel 34. If desired, the wheel 34 may include ribs to provide improved friction between the thumb 108 and the surface of the wheel 34, which in turn, improve control. Additionally, the scrolling wheel 34, is in full view of the user on the thumb side which results in providing the user with visual feedback regarding the position of the wheel 34.

Figure 2:
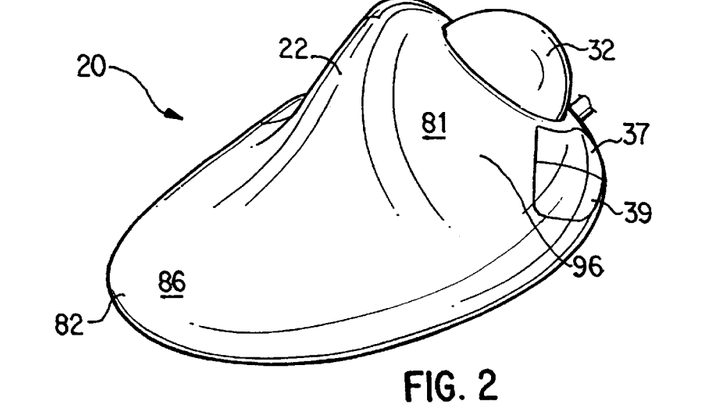
FIG. 2 is a rear-ulnar perspective view of the computer input device of FIG. 1.
Figure 3:
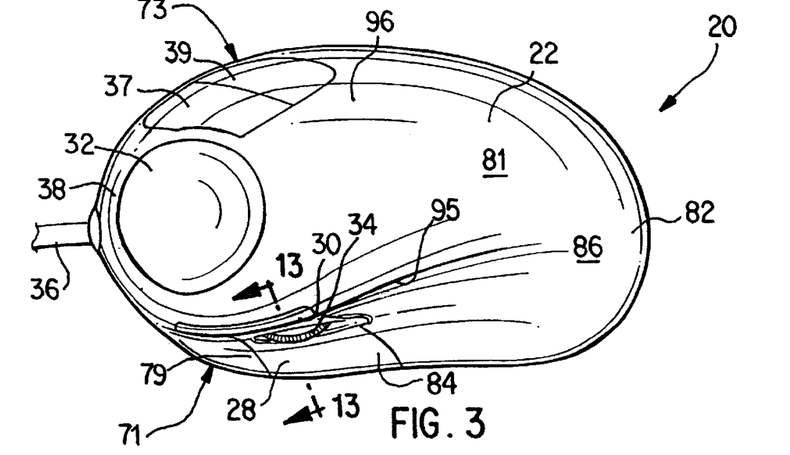
FIG. 3 is a top plan view of the computer input device of FIG. 1.
Figure 5:
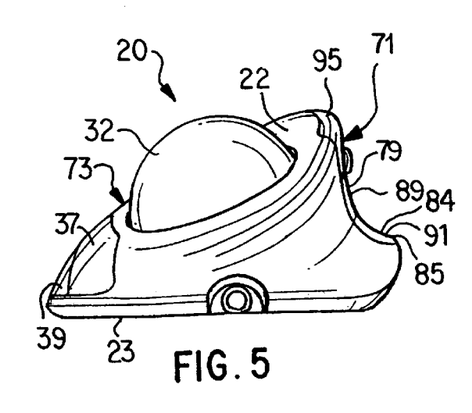
FIG. 5 is a front elevational view of the computer input device of FIG. 1.
Figure 6:
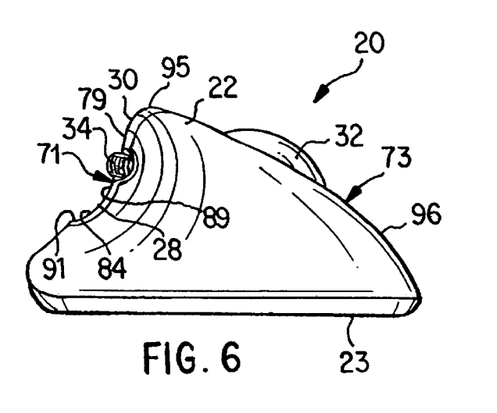
FIG. 6 is a rear elevational view of the computer input device of FIG. 1.
Figure 7:
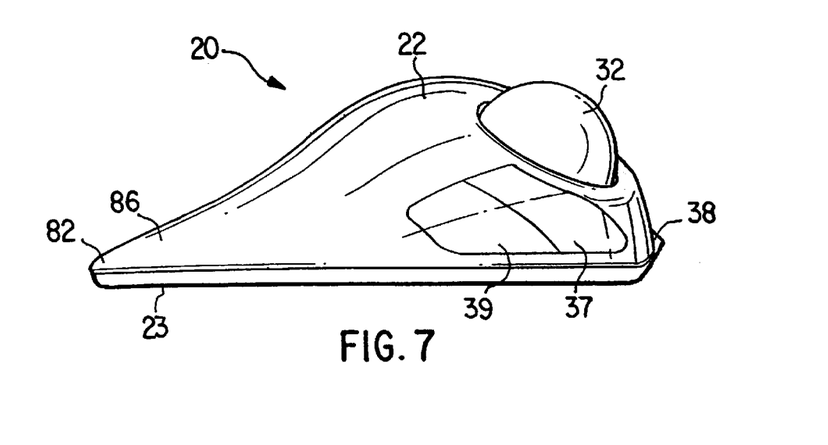
FIG. 7 is an ulnar side elevational view of the computer input device of FIG. 1.

As best shown in FIGS. 2, 5, and 7, the finger or ulnar side 73 includes the trackball 32 and the forward and back buttons 39 and 37. The ball 32 is positioned for access and motion by the index finger 106 and/or the middle finger 111. This placement allows the fingers 106 and/or 111 to rest upon the ball 32 without undue extension or uncomfortable backward or side-to-side bending. Further, the orientation and size of the ball 32 with respect to the finger side supporting surface 96 enables the user to move the ball 32 forward and backward by natural flexion and extension movements and by natural adduction and abduction of the fingers 106 and/or 111. This will, in turn, reduce possible fatigue and increase control.

The back and forward buttons 37 and 39 are positioned on the ulnar side of the trackball 32 and their positions enhance the user's options for interfacing and operating the input device 20. Further, the back button 37 is positioned immediately adjacent to the ball 32 and the forward button 39 is positioned immediately adjacent to the back button 37. As these buttons 37 and 39 can be important input tools for certain computer programs, such as a browser, their convenient positioning enhances comfort and reduced fatigue. As there are a number of comfortable interfacing positions, the user may switch between alternative comfortable hand positions to prevent certain repetitive movement injuries.

Figure 9:
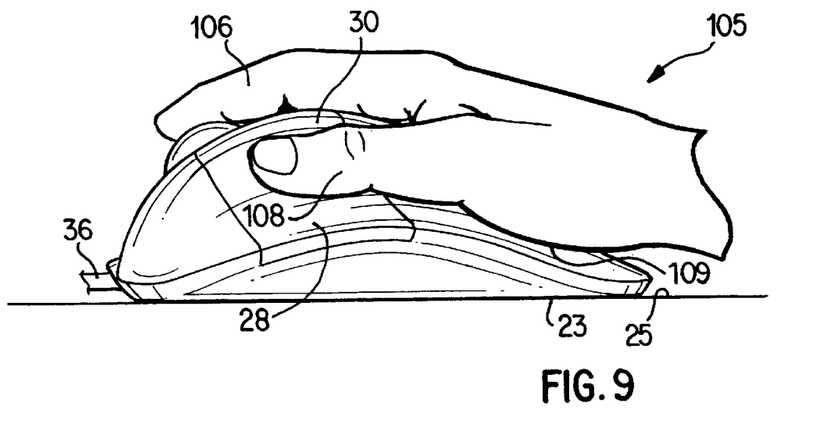
FIG. 9 is a view similar to FIG. 4 showing the relationship between the hand of the user and the computer input device.
Figure 10:
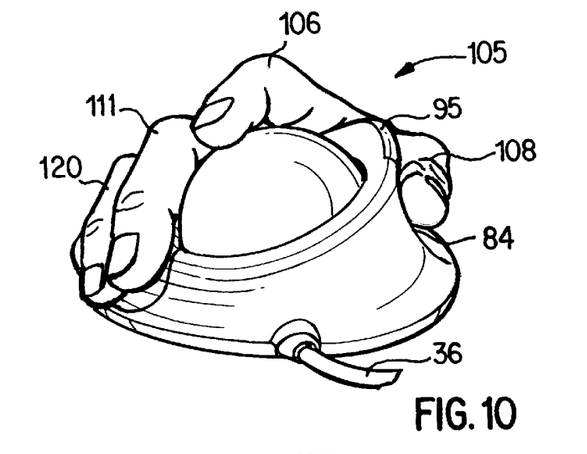
FIG. 10 is a view similar to FIG. 5 showing the relationship between the hand of the user and the computer input device when the user is controlling the ball with one finger.
Figure 11:
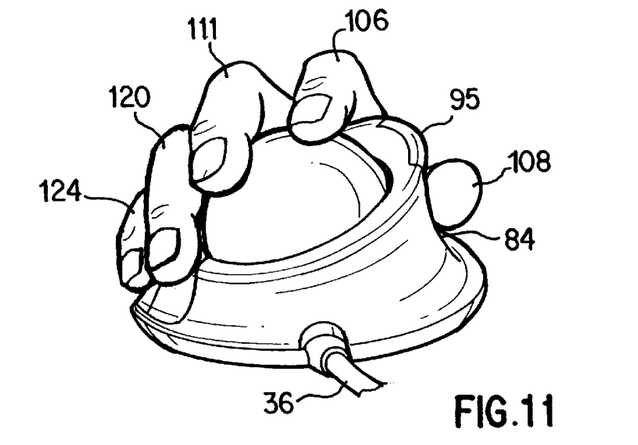
FIG. 11 is a view similar to FIG. 10 showing the relationship between the hand of the user and the computer input device when the user is controlling the ball with two fingers.
Figure 12:
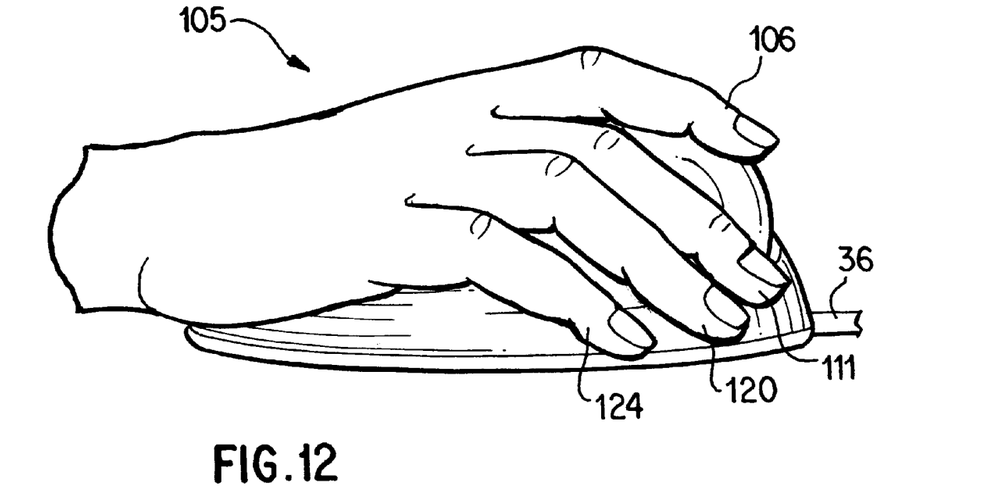
FIG. 12 is a view similar to FIG. 7 showing the relationship between the hand of the user and the computer input device.

For example, the user may choose to operate the trackball 32 solely by his or her index finger 106, as shown in FIGS. 9, 10, and 12, or by using his or her index and middle fingers 106 and 111, as shown in FIG. 11. The use is comfortable in either operating arrangement. If the user chooses to operate the trackball 32 by his or her index finger 106 only, as shown in FIGS. 9, 10, and 12, the back button 37 is conveniently positioned for use by the middle finger 111. The forward button 39 is conveniently positioned for use by the ring finger 120 or by the middle finger 111 moving over from the back button 37.

The shape of the finger supporting surface 96 and the positioning of the ball 32 with respect to the back button 37 enables the user, if desired, to use his or her middle finger 111 to participate in the control of the ball 32, as shown in FIG. 11. The user then has another option to dedicate his or her middle finger 111 in assisting with the movement of the ball 32, or to naturally move the middle finger 111 between the ball 32 and the back button 37. If the middle finger 111 is dedicated to assisting in the control of the ball 32, the back and forward buttons 37 and 39 may be respectively operated by the ring finger 120 and the little finger 124. If the user desires to move his or her middle finger 111 to assist with the buttons 37 and 39, the forward button 39 may be operated by either the ring finger 120 or the middle finger 111.

Regardless of the hand positioning chosen for operation, the buttons 37 and 39 are positioned and oriented for reach by the middle and ring fingers in the natural direction of movement along the axis of adduction and flexion. The buttons 37 and 39 are actuated by a generally downward applied force by the desired finger by a flexion movement. This prevents the user from having to rotate or twist their fingers awkwardly to depress the buttons 37 and 39.

In an alternate arrangement, as shown in FIGS. 14–17, a switch actuator 130 or 140 having a sliding or pivoting member is used on the ulnar side of trackball 32 in lieu of the back and forward buttons 37 and 39. In a preferred arrangement of each, a three-position switch is used. The switch 130 or 140 preferably includes neutral center position and first and second active positions which provide certain input signals such as back and forward. However, it is recognized that one or more two position switches may be used, and each such switch would have a neutral position, and an active position that provides a desired input signal.

Figure 14:
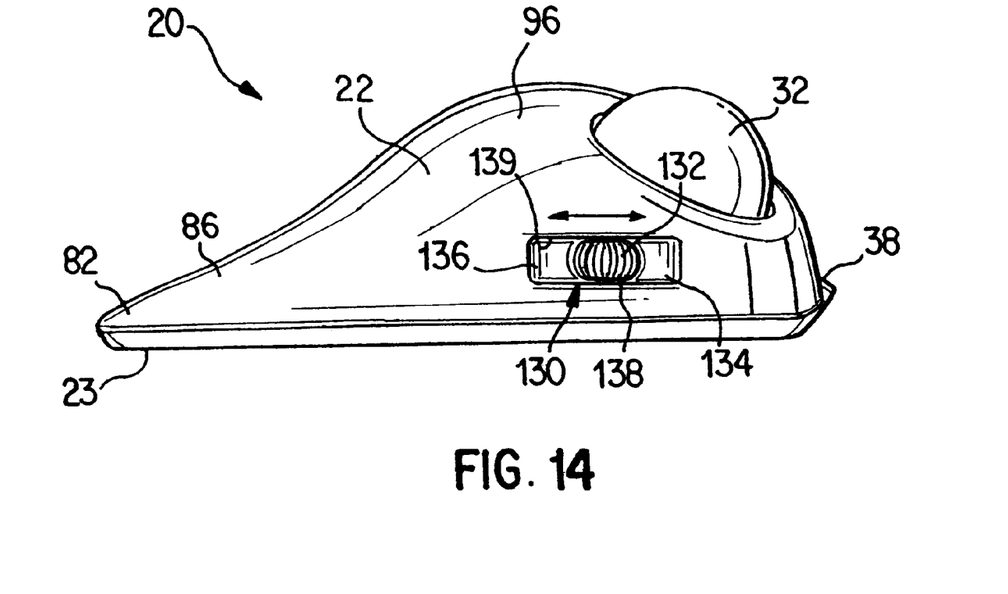
FIG. 14 is a view similar to FIG. 7 showing an alternative embodiment of the computer input device having a finger-engagable sliding input element.
Figure 15:
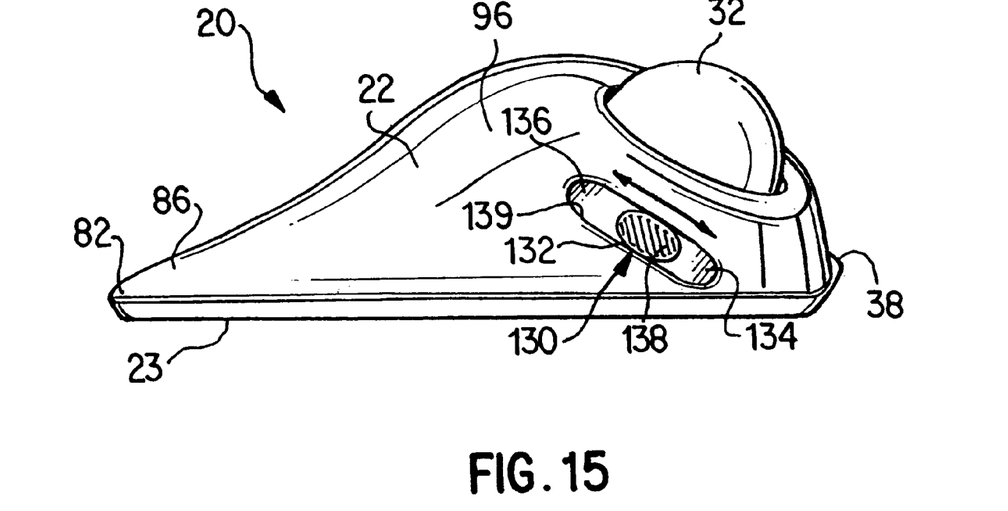
FIG. 15 is a view similar to FIG. 16 showing finger-engagable sliding input element in a different orientation.

If a sliding switch 130 is used, as shown in FIGS. 14 and 15, the switch 130 includes a finger interfacing sliding member 138 that is movable within a groove 139 associated with the housing 22. The switch 130 is positioned for convenient use by either the middle finger 111 or the ring finger 120. The sliding member 138 is biased to a center neutral position 132 as shown in FIGS. 14 and 15. By moving the desired finger forward or backward, the sliding member 138 will move respectively forward or backward in its groove 139 against its biasing to place the sliding member 138 in a forward position 134 or a backward position 136. Such an actuation will send an appropriate signal to the computer 40. For example moving the sliding or pivoting element forward or backward may be used to provide a forward or back command signal, respectively, or vice versa, to an internet browser program. The biasing will return the sliding member 138 to its neutral position 132 upon the user releasing the applied force.

In the embodiment shown in FIG. 14, the sliding member 138 moves along a substantially horizontal axis parallel to the work support surface 25. In the alternative arrangement of FIG. 15, the sliding member 138 moves along an axis oriented generally parallel to the user's middle or ring finger in use as can be seen from the comparison of FIGS. 12 and 15. However, it is recognized that other orientations may be used.

Figure 16:
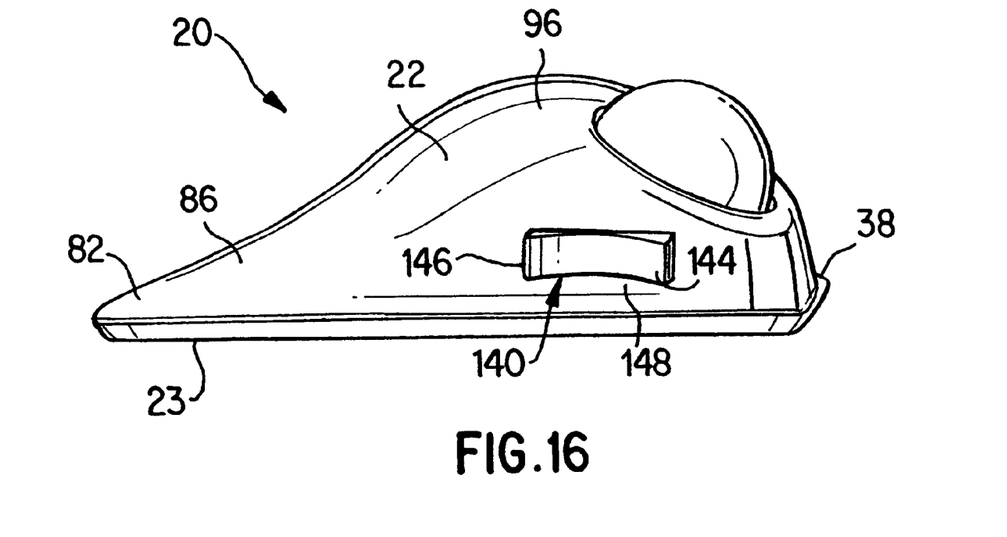
FIG. 16 is a view similar to FIG. 7 showing an alternative embodiment of the computer input device having a finger-engagable pivoting input element.
Figure 17:
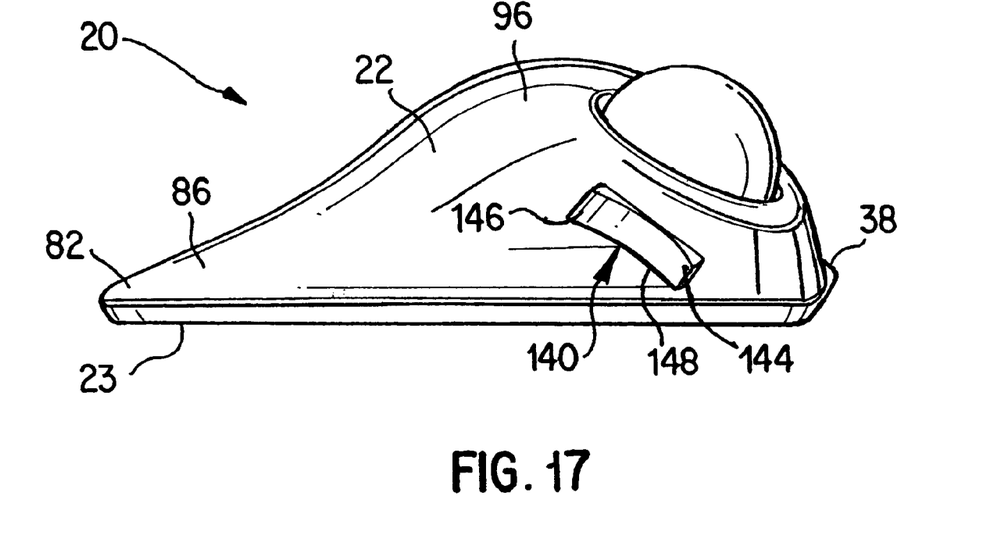
FIG. 17 is a view similar to FIG. 16 showing finger-engagable pivoting input element in a different orientation.

If a pivoting switch 140 is used, as shown in FIGS. 16 and 17, the switch 140 includes a finger interfacing pivoting member or rocker 148 that is pivotally coupled to the housing 22. The switch 140 is positioned for convenient use by either the middle finger 111 or the ring finger 120, or the middle finger 111 and the ring finger 120. The rocker 148 is biased to a center neutral position, as shown in FIGS. 16 and 17. By moving the desired finger or fingers forward or backward toward the front 144 or the rear 146 of the rocker 148, the rocker 148 will pivot respectively forward or backward against its biasing to place the rocker 148 in a forward position or a backward position. Such an actuation will cause the input device 20 to send an appropriate signal to the computer 40. The biasing will return the rocker 148 to its neutral position upon the user releasing the applied force.

In the embodiment shown in FIG. 16, the rocker 148 pivots in a substantially horizontal plane that it parallel to the work support surface 25. In the alternative arrangement of FIG. 17, the rocker 148 pivots in a plane generally coincident to the user's middle or ring finger in use as can be seen from the comparison of FIGS. 12 and 17. However, it is recognized that other orientation may be used.

The sliding or pivoting switch 130 or 140 is preferably positioned for reach by the middle and/or ring fingers 111 and 120 for activation by the user in a natural direction of movement along the axis of flexion and extension of the middle and ring fingers 111 and 120. As with the back and forward buttons 37 and 39, the design allows the user many comfortable interfacing positions, enabling the user to switch between alternative comfortable hand positions to prevent certain repetitive movement injuries and to achieve maximum functionality.

For example, the user may choose to operate the trackball 32 solely by his or her index finger 106, or by using his or her index and middle fingers 106 and 111. The use is comfortable in either operating arrangement. If the user chooses to operate the trackball 32 by his or her index finger 106 only, the sliding or pivotal switch 130 or 140 is conveniently positioned for use by the middle finger 111 and/or the ring finger 120.

The shape of the finger supporting surface 96 and the positioning of the ball 32 with respect to the switch 130 or 140 enables the user, if desired, to use his or her middle finger 111 to participate in the control of the ball 32. The user then has another option to dedicate his or her middle finger 111 in assisting with the movement of the ball 32, or to naturally move the middle finger 111 between the ball 32 and the switch 130 or 140. If the middle finger 111 is dedicated to assisting in the control of the ball 32, the switch 130 or 140 may be operated by the ring finger 120. If the user desires to move his or her middle finger 111 to assist with the switch 130 or 140, the switch 130 or 140 may be operated by either the middle finger 111, or the middle finger 111 and the ring finger 120. Accordingly, the orientation and position the switch 130 or 140 provide convenient and comfortable actuation as the switch 130 or 140 is within easy reach by middle and ring fingers and the switch may be actuated with minimal extension and flexion of the finger.

While use of the back and forward buttons 37 and 39 or a switch 130 or 140 are useful for forward and back commands for an internet browser program, they may be remapped to provide the commands normally given by the primary and secondary buttons 28 and 30, and visa-versa.

Further, as shown in FIGS. 1, 4, and 9, the outer thumb surface 79 and the thumb support surface 84 on the radial or thumb side 71 are elevated from the work surface 25 by an enlarged bottom side section 83. This raises the thumb 108 and places it in a comfortable location with respect to the remainder of the hand. It also provides a desired slant to the finger supporting surface 96 which is preferably not too large and supports the metacarpal-phalangeal ridge 64. It also enables the thumb support to support the thumb without restricting thumb motion. The elevated level of the dividing ridge 95 raises the side of the finger supporting surface 96 closest to the thumb. This places the thumb supporting surface 84 and the exposed portion of the wheel 34 for manipulation at an elevation lower than the exposed portion of the trackball 32 that is manipulated.

A preferred embodiment is depicted to scale in the drawing figures. It is preferably sized to completely support the entire hand of the user off of the support or work surface 25. Accordingly, in use, the user's palm heel of hand, the ulnar side of the hand including the little finger, and the radial side of the hand including the thumb are preferably supported by the device 20 so that they do not touch the surface 25. In one of an infinite number of arrangements, the length is approximately 6.75 inches and its width is approximately 4 inches. In this preferred arrangement, the scroll wheel 34 preferably has a diameter of approximately 1 inch and the ball 32 preferably has a diameter of about 1.75 inches. Further, in a preferred arrangement, the angle of pronation, as measured at the metacarpal-phalangeal supporting ridge 64, is preferably under 45 degrees while the angle of extension of the wrist, as measured at the metacarpal region 78 of the middle finger with respect to the arm, or in this case, also the working surface 25, is preferably between 15 and 40 degrees. Further, in this one arrangement, the scroll wheel 34 preferably has a diameter of approximately 1 inch, and the ball 32 preferably has a diameter of approximately 46 mm. In this same embodiment, the back button 37 is approximately 35 mm by 17 mm, with the forward button 39 slightly smaller. If a toggle 140 or slider 130 is used, one preferred size for these elements is approximately 8 mm by 3.5 mm. However, the invention is not limited to such dimensions and it is recognized that numerous other sizes may be used. Importantly, it is recognized that the housing can be in any of a number of infinite shapes with varying proportions and shapes of actuators.

In operation, the user places his or her hand 105 on the computer input device 20. As the computer input device 20 is sized to accommodate the entire hand 105, the user may comfortably rest the entire weight of his or her hand 105 on the input device 20 without any part of the hand 105 touching the work surface 25 upon which the input device 20 sits. This total support of the hand 105 may continually exist for all activations of the activators. In this process, the user places his or her thumb 108 on the thumb side 71, and more specifically, places it on the thumb rest or thumb supporting surface 84. The user places his or her remaining fingers 106, 111, 120 and 124 on the finger side 73 so that the upper surface 96 of the finger side 73 comfortably supports the metacarpal-phalangeal ridge 64.

The actuators on the thumb or radial side 71, that is the primary button 28, the secondary button 30, and the scroll wheel 34, are activated by the user's thumb 108. To activate the primary button 28, the user merely needs to apply a slight force with the thumb 108 in the direction toward the other fingers. To activate the secondary button 30, the user raises his or her thumb slightly above the scroll wheel 34 and applies a slight force with the thumb 108 in the direction toward the other fingers. To activate the scroll wheel 34, the user places his or her thumb 108 against the wheel 34 and uses a natural flexion or extension movement of the thumb 108 to move the scroll wheel 34 in the desired direction. Depending upon the size of the user's thumb 108, it may be necessary for the user to slightly raise his or her thumb 108 to engage the wheel 34. When the thumb 108 is not being used to activate the primary button 28, the secondary button 30, or the scroll wheel 34, he or she may rest the full weight of his or her thumb 108 on the horizontal component 91 of the primary button 28, using the primary button 28 as a thumb rest, without activating the primary button 28.

The actuators on the finger or ulnar side 73, that is the back button 37, the forward button 39, and the trackball 32, are activated by the user's remaining finger's 106, 111, 120, and 124 in any of a number of optional configurations as described above. The user may comfortably move the trackball 32 in any desired direction by contacting the trackball 32 with his or her index finger 106, as shown in FIG. 10, or by his or her index and middle fingers 106 and 111, as shown in FIG. 11, and moving his or her finger(s) in a corresponding direction to rotate the trackball 32. The back button 37 may be activated by pressing generally downward in a natural motion with the middle finger 111 or the ring finger 120 properly positioned over the button 37. The forward button 39 may be activated by pressing generally downward in a natural motion with the middle finger 111, the ring finger 120, or little finger 124 properly positioned over the button 39. These downward motions to activate the buttons 37 and 39 can be performed by a natural flexion movement the desired finger. If the computer input device 20 has an actuator 130 or 140 with a three-position sliding or pivoting member 138 or 148 in lieu of input buttons 37 and 39, the user may activate that activator 130 or 140 by sliding or pivoting the member 138 or 148 in a forward or rearward direction.

Activating the desired activators will provide a corresponding input signal to the computer 44. The signals are processed into a corresponding command as determined by a computer program. That command may be used for other programs. The activators may be remapped in a known manner so that certain activators behave to send signals that produce commands normally expected by other activators. For example, the input buttons 28, 30, 37 and 39 may be mapped so that the described back and forward buttons 37 and 39 provide signals that result in commands normally expected from primary and secondary input buttons 28 and 30, and vice-versa. This is beneficial for users having finger usage preferences for certain applications.

Having illustrated and described the principles of the present invention in a preferred embodiment, it should be apparent to those skilled in the art that the embodiment can be modified in arrangement and detail without departing from such principles. For example, the invention contemplates using the thumb operable and/or horizontally-oriented scroll wheel on a non-trackball input device such as computer mouse. Accordingly, we claim as our invention all such embodiments as come within the scope and spirit of the following claims and equivalents thereto.

What is claimed is:

1. A computer input device adapted for use by a hand of a user comprising:
    a housing having a thumb side adapted for interfacing with a thumb of the hand of the user and a finger side adapted for interfacing with a plurality of fingers of the hand of the user;
    an actuator including a wheel, said wheel being positioned on the thumb side enabling its manipulation by the thumb of the user;
    a second actuator, said second actuator including an input button positioned on the thumb side immediately adjacent to the wheel.

2. The computer input device of claim 1, wherein the input button of the second actuator has a supporting surface adapted to serve as a thumb rest for the user, said input button of the second actuator being laterally depressible in a direction toward the finger side of the housing to activate the second actuator, and wherein a downward force on the supporting surface of the input button of the second actuator will not activate the second actuator.

3. The computer input device of claim 1, wherein said housing further includes a dividing ridge separating the thumb side and the finger side, said computer input device further comprising a third actuator, said third actuator including an input button positioned on the thumb side and forming part of the dividing ridge.

4. The computer input device of claim 1, further comprising a third actuator, said third actuator including a linearly slidable element on the finger side of the housing.

5. The computer input device of claim 1, further comprising a third actuator, said third actuator including a pivoting element on the finger side of the housing.

6. The computer device of claim 1, further comprising a third actuator and a fourth actuator, said third actuator including a sphere mounted for movement on the finger side of the housing, and said fourth actuator including a three-position switching element on the finger side of the housing adjacent to the sphere.

7. The computer device of claim 1, further comprising a third actuator and a fourth actuator, said third actuator including a sphere mounted for movement on the finger side of the housing, and said fourth actuator including an input button on the finger side of the housing immediately adjacent to the sphere.

8. The computer device of claim 7, further comprising a fifth actuator, said fifth actuator including an input button on the finger side of the housing immediately adjacent to the input button of the fourth actuator.

9. The computer input device of claim 1, further comprising a third actuator, said third actuator including an input button positioned on the thumb side immediately adjacent the wheel and on the opposite side of the wheel from the input button of the second actuator.

10. The computer input device of claim 9, wherein the input button of the second actuator is immediately below the wheel and the input button of the third actuator is immediately above the wheel.

11. A computer input device adapted for use by a hand of a user comprising:
    a housing, said housing having a bottom supporting surface adapted to interface with a planar work surface, a thumb side adapted for interfacing with a thumb of the hand of the user, and a finger side adapted for interfacing with a plurality of fingers of the hand of the user;
    a first actuator, said first actuator located on said thumb side including a wheel mounted for movement in a plane substantially parallel to the work surface;
    a second actuator, said second actuator including an input button positioned on the thumb side of the housing immediately adjacent the wheel.

12. The computer input device of claim 11, wherein the input button of the second actuator has a supporting surface adapted to serve as a thumb rest for the user, said input button of the second actuator being laterally depressible in a direction towards the finger side of the housing to activate the second actuator, and wherein a downward force on the supporting surface of the input button of the second actuator will not activate the second actuator.

13. The computer input device of claim 11, further comprising a third actuator, said third actuator including an input button positioned on the thumb side immediately adjacent the wheel and on the opposite side of the wheel from the input button of the second actuator.

14. The computer input device of claim 13, wherein said input button of the second actuator is immediately below the wheel and the input button of the third actuator is immediately above the wheel.

15. The computer device of claim 11, further comprising a third actuator, said third actuator including a sphere mounted for movement on the finger side of the housing.

16. The computer device of claim 15, further comprising a fourth actuator, said fourth actuator including a three-position switching element on the finger side of the housing adjacent to the sphere.

17. The computer device of claim 15, further comprising a fourth actuator, said fourth actuator including an input button on the finger side of the housing immediately adjacent to the sphere.

18. The computer device of claim 17, further comprising a fifth actuator, said fifth actuator including an input button on the finger side of the housing immediately adjacent to the input button of the fourth actuator.

19. A computer input device adapted for use by a hand of a user comprising:
   a housing; and
   an actuator, said actuator having a linearly slidable member coupled to the housing and being disposed for engagement by a user, said input device adapted to send a signal to a computer to produce a command when the actuator is activated;
   a second actuator, said second actuator including a user manipulated sphere mounted for movement to the housing;
   wherein said housing includes a thumb side adapted for interfacing with a thumb of the hand of the user and a finger side adapted for interfacing with a plurality of fingers of the hand of the user, said sphere and linearly slidable member being positioned on the finger side of the housing.

20. The computer input device of claim 19, wherein said linearly slidable member is positionable into first, second, and third positions, said second position being between said first and third positions, said linearly slidable member being biased into said second position.

21. The computer input device of claim 19, wherein said computer input device further comprises a base surface adapted to interface with a horizontal work surface, said linearly slidable member being movable in an axis substantially parallel to the work surface.

22. The computer input device of claim 19, further comprising a third actuator, said third actuator including a rotatable wheel, said wheel being positioned on the thumb side enabling its manipulation by the thumb of the user.

23. The computer input device of claim 22, wherein said wheel is rotatable in a generally horizontal plane.

24. A computer input device adapted for use by a hand of a user comprising:
   a housing, said housing includes a thumb side adapted for interfacing with a thumb of the hand of the user and a finger side adapted for interfacing with a plurality of fingers of the hand of the user;
   a first actuator, said actuator having a pivotally movable member coupled to the housing, engagable by a user, and adapted to send a signal to a computer when activated; and
   a second actuator, said second actuator including a finger-engagable sphere mounted to the housing for rotational movement.

25. The computer input device of claim 24, wherein said pivotally movable member is positionable into first, second, and third positions, said second position being between said first and third positions, said pivotally movable member being biased into said second position.

26. The computer input device of claim 24, wherein said computer input device further comprises a base surface adapted to interface with a horizontal work surface, said pivotally movable member being movable in a plane substantially parallel to the work surface.

27. The computer input device of claim 24, wherein said sphere and pivotally movable member are positioned on the finger side of the housing.

28. The computer input device of claim 27, further comprising a third actuator, said third actuator including a rotatable wheel, said wheel being positioned on the thumb side enabling its manipulation by the thumb of the user.

29. The computer input device of claim 28, wherein said wheel is rotatable in a generally horizontal plane.

30. The computer input device of claim 28, wherein said pivotally movable member is positionable into first, second, and third positions, said second position being between said first and third positions, said pivotally movable member being biased into said second position.

31. A computer input device adapted for use by a hand of a user comprising:
   a housing having a thumb side adapted for interfacing with a thumb of the hand of the user and a finger side adapted for interfacing with a plurality of fingers of the hand of the user;
   an actuator, said actuator including an input button mounted to the thumb side of the housing, said input button of the actuator having a supporting surface adapted to serve as a thumb rest for the user, said input button being laterally depressible in a direction towards the finger side of the housing to activate the actuator, and wherein a downward force on the supporting surface of the input button will not activate the actuator.

32. The computer input device of claim 31, wherein the button of the actuator has a bottom section that includes a generally horizontal portion and a generally vertical portion, said button being curved between its generally horizontal portion and its generally vertical portion.

33. The compute input device of claim 31, wherein said actuator is a first actuator, said input device further comprising a second actuator, said second actuator including an input button positioned on the thumb side immediately adjacent the input button of the first actuator.

34. The computer input device of claim 33, wherein said housing further includes a dividing ridge separating the thumb side and the finger side, and said thumb side has an outer surface portion extending from the dividing ridge to an outer radial portion of the thumb side surface, said input button of the second actuator forming part of the dividing ridge, and said buttons of the first and second actuators spanning entire distance of thumb side outer surface from the dividing ridge to the outer radial portion of the thumb side surface.

35. The computer input device of claim 34, further comprising a third actuator, said third actuator including a rotatable wheel, said wheel being disposed on the thumb side between the buttons of the first and second actuators enabling its manipulation by the thumb of the user.

36. The computer input device of claim 35, further comprising a fourth actuator, said fourth actuator including a finger-engagable sphere mounted to the finger side of the housing.

37. The computer input device of claim 36, further comprising a fifth actuator, said fifth actuator including a three-position switching element on the finger side of the housing.

38. The computer device of claim 36, further comprising a fifth actuator, said fifth actuator including an input button on the finger side of the housing immediately adjacent to the sphere.

39. The computer device of claim 38, further comprising a sixth actuator, said sixth actuator including an input button on the finger side of the housing immediately adjacent to the input button of the fifth actuator.

* * * * *